Sept. 17, 1963  G. S. KLEIN  3,104,386
PORTABLE INTERVAL TIMER HAVING RELAY CONTROLLED
TIME MOTOR AND SIGNALLING MEANS
Filed Oct. 27, 1959
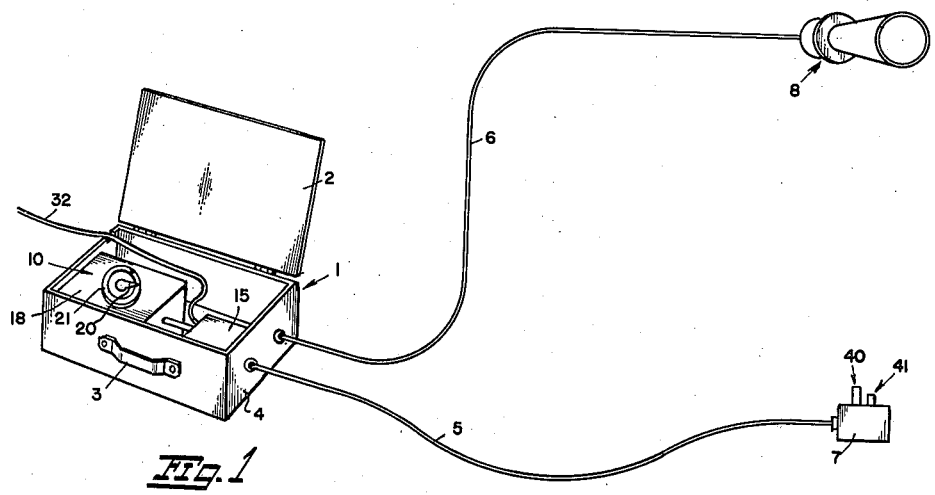
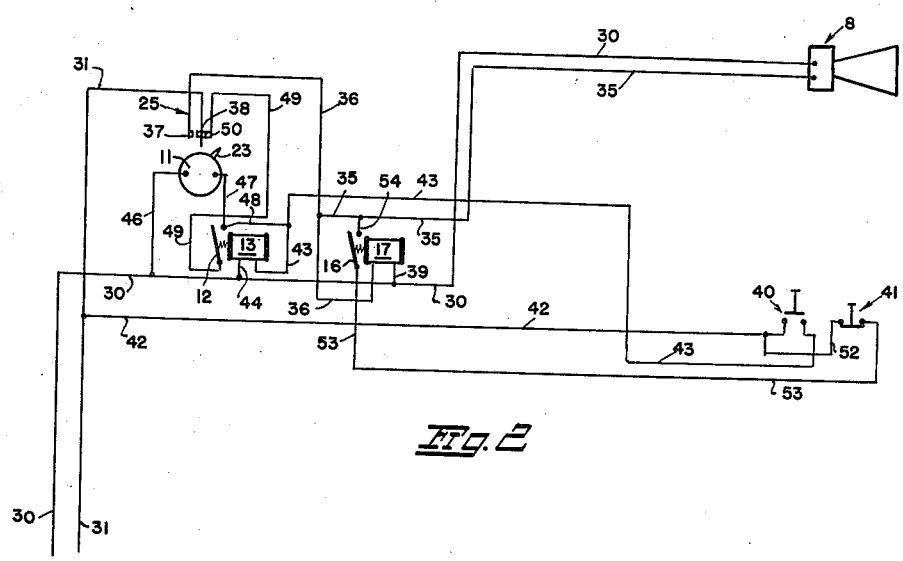
GEORGE S. KLEIN
INVENTOR.
BY James O'Girman
ATT'Y

United States Patent Office 3,104,386
Patented Sept. 17, 1963

3,104,386
PORTABLE INTERVAL TIMER HAVING RELAY CONTROLLED TIME MOTOR AND SIGNALLING MEANS
George S. Klein, Box 53, Goldendale, Wash.
Filed Oct. 27, 1959, Ser. No. 849,093
1 Claim. (Cl. 340—309.1)

This invention relates generally to timing devices, and more particularly to a timing and signalling device adapted for, although not necessarily limited to, use in sporting events wherein a contestant must endure a certain feat for a predetermined interval of time, as, for example, in rodeo shows, wherein a rider of wild horses, bucking broncos, Brahma bulls, and the like must remain in the saddle for a qualifying period of time measured in a stipulated number of seconds in order to compete for prize-winning riding time beyond the qualifying time.

It is one of the principal objects of the invention to provide a device of the character described comprising an audible signal, preferably located at or near a starting gate, electrically connected to an otherwise portable carrying case and to a switch box, also electrically connected to the carrying case, and to a motor actuated timer switch and relay switches mounted within the case. The switch box may be conveniently carried about by a referee, within the limits of the cord attachment of the box to the case, and manipulated to start the timer switch to run off the stipulated seconds of the qualifying period. Upon reaching the "time-out" position, the audible signal will be energized to announce the successful qualification of the rider. If, however, the rider should be thrown from his mount at any time during the qualifying ride, or should violate some starting or riding rule, or meet with an accident, the referee can instantly break the electrical circuit to the signal to prevent its timed operation.

A further object of the invention is the provision of a timing and signalling device which is of efficient, durable, compact construction, positive in its automatic operation, and one which will eliminate all doubts as to the accuracy of its timing operation as compared with manually operated timers, stop-watches, and signals heretofore used in the foregoing and other sporting events.

The foregoing and other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view of a timing and signalling device made in accordance with my invention; and FIGURE 2 is its electrical wiring diagram.

With continuing reference to the drawing, wherein like reference numerals designate like parts, numeral 1 indicates generally a carrying case provided with a lid 2 and handle 3. Plug-in receptacles are provided in an end wall 4 of the case for cords 5 and 6 leading respectively to a switchbox 7 and a horn 8. The horn is preferably mounted in a fixed position, while the switchbox may be moved about, within limits, by an operator.

Within the case is a housing 10 for a motor 11, shown diagrammatically in FIGURE 2, and also for a relay switch 12 operable by its electromagnet coil 13. A second housing 15 is provided within the case for a second relay switch 16 operable by its electromagnet coil 17. The top wall 18 of the housing 10 is provided with a pointer 20 manually positionable around a dial 21 inscribed with numerals indicating, for example, the seconds of a minute.

Within the housing 10 and operable by the motor 11 is a switch arm 23 matching the pointer 20 and adapted to open and close a re-set timer switch disposed within the housing 10 and indicated generally at 25 in FIGURE 2.

Electrical conductors 30 and 31 (FIGURE 2) from a source of electrical energy (not shown) extend through a conduit 32 to the interior of the housing 15. The conductor 30, through the cord 6, is connected to one side of the horn 8 whose opposite side is connected by wires 35 and 36 to one fixed contact 37 of the selector switch 25 and connectible through that contact and through movable contact 38 to the other conductor 31. One side of relay coil 17 is also connected by wire 36 to the fixed contact 37 and its opposite side is connected by wire 39 to conductor 30.

The switchbox 7 contains (FIGURE 2) a push-button motor switch 40 and a push-button horn switch 41. One side of the motor switch is connected by wire 42 to the conductor 31, and its opposite side is connected by wire 43 to one side of the relay coil 13. The opposite side of this coil is connected by wire 44 to the other conductor 30. One side of the motor 11 is connected by wire 46 to the conductor 30, and its opposite side by wire 47 to one side of the relay switch 12, and by wire 48 to wire 43. The opposite side of this switch is connected by wire 49 to the other fixed contact 50 of the selector switch 25 and through the movable contact 38 to the conductor 31.

One side of the horn switch 41 is connected by wire 52 to wire 42 and thus to conductor 31. The other side of the horn switch is connected by wire 53 to one side of relay switch 16, whose opposite side is connected by wire 54 to wire 35 and thus to wire 36.

From the foregoing it will be apparent that closing of the motor switch 40 will energize relay coil 13 to close switch 12, and that such closure will complete the circuit from the conductor 30, wire 46, through the motor 11, wire 47, switch 12, wire 49, across closed contacts 38 and 50, back to the other conductor 31, to put the motor into operation. The motor will continue to operate until the circuit just described is broken by separation of the contact 38 from the contact 50 by the switch arm 23 of the timer switch 25 when it reaches its "time out" position. The timer switch is of the conventional type wherein the switch arm 23 along with the pointer 20 will, after reaching the "time out" position, return to their original setting. For example, if they are set in the 10-second position, approximately as shown, they will automatically return to that position unless re-set to some other position of longer or shorter duration.

Upon reaching the "time out" position, the switch arm 23 will at the same time move contact 38 against fixed contact 37 to thereby complete a circuit from conductor 31 through contacts 37—38, wire 36 to one side of relay coil 17 and from the other side thereof through wire 39 back to the other conductor 30. The momentary closing of contacts 37—38 will energize relay coil 17 to close normally open relay switch 16, and thereafter current will flow from one side of horn switch 41, through wire 53, across now closed switch 16, through wires 54 and 35 to one side of horn 8, and from the other side thereof back to conductor 30. Thus the horn will continue to operate until the circuit just described is opened by the manual switch 41.

While I have shown a particular form of embodiment of my invention I am aware that many minor changes therein will readily suggest themselves to others skilled in the art without departing from the spirit and scope of the invention.

Having thus described my invention what I claim as new and desire to protect by Letters Patent is:

An electric signalling device comprising in combination a portable carrying case, a variable time delay switch and actuating motor therefor disposed within said case, said timer switch comprising two fixed contacts and a movable contact therebetween, said movable contact operable by an actuating arm driven by said motor to contact with one of said fixed contacts and normally spring held in contact with the other of said fixed contacts, a first relay disposed within said case and comprising an electromagnet and a switch operable thereby, a second relay disposed within said case and comprising an electromagnet and a switch operable thereby, an electrically operated signal adapted to be fixedly supported at a point remote from said carrying case, a normally open manually operable motor switch, a normally closed manually operable signal switch both mounted within a single switch box remote from and flexibly connected to said case, a source of current, said motor in circuit with said source through the switch of said first relay and said the other of said fixed contacts and the movable contact of said timer switch, the electromagnet of said first relay in circuit with the source through said motor switch, a holding circuit for said first relay through said source, said first relay electromagnet, said first relay switch and said other contact, an energizing circuit for said second relay through said source, said one of said fixed contacts, said movable contact and the electromagnet of said second relay, a holding circuit for said second relay through said source, said normally closed signal switch, said second relay switch and the electromagnet of said second relay, and an energizing circuit for said signal through said source, said normally closed signal switch, said second relay switch and said signal, whereby closure of the manual motor switch will actuate the motor to break the circuit to the electromagnet of the first relay at the end of a predetermined time period and close the circuit to energize the electromagnet of the second relay according to the setting of said variable timer switch and thereby direct current through the switch of the second relay and said signal switch to said signal and whereby said signal circuit may be selectively broken by opening the manually operable signal switch.

References Cited in the file of this patent
UNITED STATES PATENTS

| | | |
|---|---|---|
| 224,060 | Voelker | Feb. 3, 1880 |
| 2,211,868 | Steeneck | Aug. 20, 1940 |
| 2,348,431 | Warmey | May 9, 1944 |